US006628801B2

(12) United States Patent
Powell et al.

(10) Patent No.: US 6,628,801 B2
(45) Date of Patent: Sep. 30, 2003

(54) IMAGE MARKING WITH PIXEL MODIFICATION

(75) Inventors: Robert D. Powell, Issaquah, WA (US); Mark J. Nitzberg, Cambridge, MA (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/417,153

(22) Filed: Oct. 12, 1999

(65) Prior Publication Data

US 2002/0037090 A1 Mar. 28, 2002

Related U.S. Application Data

(63) Continuation of application No. 09/317,784, filed on May 24, 1999, now Pat. No. 6,072,888, which is a continuation of application No. 09/074,632, filed on May 7, 1998, now Pat. No. 5,930,377, which is a continuation of application No. 08/969,072, filed on Nov. 12, 1997, now Pat. No. 5,809,160, which is a continuation of application No. 07/923,841, filed on Jul. 31, 1992, now Pat. No. 5,721,788.

(51) Int. Cl.[7] ................................................. H04K 1/00
(52) U.S. Cl. ......................................... 382/100; 380/54
(58) Field of Search ................................ 382/100, 112, 382/232; 340/825.34, 5.86; 356/71; 902/1, 4, 6; 283/17, 72, 73, 113, 901; 380/210, 287, 54

(56) References Cited

U.S. PATENT DOCUMENTS

| | | | |
|---|---|---|---|
| 2,630,525 A | 3/1953 | Tomberlin et al. ............. 250/6 |
| 3,493,674 A | 2/1970 | Houghton .................... 178/5.6 |
| 3,562,420 A | 2/1971 | Thompson ...................... 178/6 |
| 3,569,619 A | 3/1971 | Simjian ...................... 178/6.8 |
| 3,576,369 A | 4/1971 | Wick et al. .................... 335/77 |
| 3,585,290 A | 6/1971 | Sanford ...................... 178/5.6 |
| 3,638,188 A | * 1/1972 | Pincoffs et al. .... 340/146.3 AC |
| 3,655,162 A | 4/1972 | Shoemaker ............ 249/219 W |
| 3,703,628 A | 11/1972 | Philipson, Jr. ......... 235/61.9 R |
| 3,805,238 A | 4/1974 | Rothjell ............... 340/146.3 E |
| 3,809,806 A | 5/1974 | Walker et al. ................ 178/7.6 |
| 3,838,444 A | 9/1974 | Loughlin et al. ........ 178/5.2 R |
| 3,845,391 A | 10/1974 | Crosby .......................... 325/64 |
| 3,914,877 A | * 10/1975 | Hines ............................. 35/2 |
| 3,922,074 A | 11/1975 | Ikegami et al. ............. 350/320 |
| 3,971,917 A | 7/1976 | Maddox et al. ....... 235/61.11 E |
| 3,977,785 A | 8/1976 | Harris ......................... 355/133 |
| 3,982,064 A | 9/1976 | Barnaby ..................... 178/5.6 |
| 3,984,624 A | 10/1976 | Waggener ................... 178/5.6 |
| 4,025,851 A | 5/1977 | Haselwood et al. .......... 325/31 |
| 4,184,700 A | 1/1980 | Greenaway .................... 283/6 |
| 4,225,967 A | 9/1980 | Miwa et al. .................. 455/68 |
| 4,230,990 A | 10/1980 | Lert, Jr. et al. ................ 455/67 |
| 4,231,113 A | 10/1980 | Blasbalg ........................ 455/29 |
| 4,237,484 A | 12/1980 | Brown et al. ................ 358/142 |

(List continued on next page.)

FOREIGN PATENT DOCUMENTS

| | | | | |
|---|---|---|---|---|
| DE | 26 43 436 | * | 5/1981 | ......... G06K/19/06 |
| DE | 3806411 A1 | | 9/1989 | ............ H04B/1/66 |
| EP | 058 482 A1 | | 8/1982 | ......... H04M/11/06 |
| EP | 0372601 A1 | | 6/1990 | ............ H04B/1/66 |
| EP | 372 604 A1 | | 6/1990 | ............ H04B/1/66 |
| EP | 411 232 A2 | | 2/1991 | .......... H04N/1/411 |
| EP | 441 702 A1 | | 8/1991 | .......... G11B/20/00 |
| EP | 0 493 091 | * | 7/1992 | ......... H04N/1/387 |
| GB | 2063018 A | | 5/1981 | ......... H04M/11/06 |
| GB | 2067871 A | | 7/1981 | ............ H04N/7/16 |
| GB | 2196167 A | | 4/1988 | .......... G11B/20/08 |
| GB | 2 204 984 A | | 11/1988 | .......... G11B/23/26 |
| WO | WO89/08915 A1 | | 9/1989 | .......... G11B/20/10 |

OTHER PUBLICATIONS

Szepanksi, "A signal Theoretic Method for Creating Forgery–Proof Documents for Automatic Verification," *Proc. 1979 Carnahan Conf. on Crime Countermeasures*, Univ. of Kentucky, Lexington, KY, May 16–18, 1979, pp. 101–109.*

Nakamura et al., "A Unified Coding Method of Dithered Image and Text Data Using Micropatterns," *Electronics and Communications in Japan*, Part I, vol. 72, No. 4, 1989, pp. 50–56.*

Wagner, "Fingerprinting," IEEE, 1983, pp. 18–22.*

Tanaka et al., "Embedding the Attribute Information into a Dithered Image," *Systems and Computers in Japan*, vol. 21, No. 7, 1990, pp. 43–50.*

Komatsu et al., "Authentication System Using Concealed Image in Telematics," *Memoirs of the School of Science and Engineering, Waseda Univ.*, No. 52, 1988, pp. 45–60.*

(List continued on next page.)

*Primary Examiner*—Andrew W. Johns
(74) *Attorney, Agent, or Firm*—Joel R. Meyer; Digimarc Corporation

(57) ABSTRACT

A method and system for embedding signatures within visual images in both digital representation and print or film. A signature is inseparably embedded within the visible image, the signature persisting through image transforms that include resizing as well as conversion to print or film and back to digital form. Signature points are selected from among the pixels of an original image. The pixel values of the signature points and surrounding pixels are adjusted by an amount detectable by a digital scanner. The adjusted signature points form a digital signature which is stored for future identification of subject images derived from the image. In one embodiment, a signature is embedded within an image by locating relative extrema in the continuous space of pixel values and selecting the signature points from among the extrema. Preferably, the signature is redundantly embedded in the image such that any of the redundant representations can be used to identify the signature. Identification of a subject image includes ensuring that the subject image is normalized with respect to the original image or the signed image. Preferably, the normalized subject image is compared with the stored digital signature.

10 Claims, 3 Drawing Sheets

U.S. PATENT DOCUMENTS

| | | | |
|---|---|---|---|
| 4,238,849 A | 12/1980 | Gassmann | 370/11 |
| 4,252,995 A | 2/1981 | Schmidt et al. | 179/1 GD |
| 4,262,329 A | 4/1981 | Bright et al. | 364/200 |
| 4,310,180 A * | 1/1982 | Mowry, Jr. et al. | 283/8 B |
| 4,313,197 A | 1/1982 | Maxemchuk | 370/111 |
| 4,367,488 A | 1/1983 | Leventer et al. | 358/147 |
| 4,379,947 A | 4/1983 | Warner | 179/1 GD |
| 4,380,027 A | 4/1983 | Leventer et al. | 358/147 |
| 4,389,671 A | 6/1983 | Posner et al. | 358/124 |
| 4,395,600 A | 7/1983 | Lundy et al. | 179/1.5 M |
| 4,416,001 A | 11/1983 | Ackerman et al. | 369/44 |
| 4,423,415 A | 12/1983 | Goldman | 340/825.34 |
| 4,425,642 A | 1/1984 | Moses et al. | 370/76 |
| 4,425,661 A | 1/1984 | Moses et al. | 375/1 |
| 4,476,468 A | 10/1984 | Goldman | 340/825.034 |
| 4,488,245 A * | 12/1984 | Dalke et al. | 364/526 |
| 4,495,620 A | 1/1985 | Steele et al. | 370/118 |
| 4,528,588 A | 7/1985 | Löfberg | 358/122 |
| 4,532,508 A | 7/1985 | Ruell | 340/825.34 |
| 4,547,804 A | 10/1985 | Greenberg | 358/142 |
| 4,553,261 A | 11/1985 | Froessl | 382/57 |
| 4,590,366 A | 5/1986 | Rothfjell | 235/494 |
| 4,595,950 A | 6/1986 | Löfberg | 358/122 |
| 4,637,051 A | 1/1987 | Clark | 382/1 |
| 4,639,779 A | 1/1987 | Greenberg | 358/142 |
| 4,644,582 A * | 2/1987 | Morishita et al. | 382/6 |
| 4,647,974 A | 3/1987 | Butler et al. | 358/185 |
| 4,654,867 A | 3/1987 | Labedz et al. | 379/59 |
| 4,660,221 A | 4/1987 | Dlugos | 380/23 |
| 4,663,518 A | 5/1987 | Borror et al. | 235/487 |
| 4,665,431 A | 5/1987 | Cooper | 358/145 |
| 4,672,605 A | 6/1987 | Hustig et al. | 370/76 |
| 4,675,746 A | 6/1987 | Tetrick et al. | 358/296 |
| 4,677,435 A | 6/1987 | D'Agraives et al. | 340/825.31 |
| 4,677,466 A | 6/1987 | Lert, Jr. et al. | 358/84 |
| 4,682,794 A | 7/1987 | Margolin | 283/82 |
| 4,697,209 A | 9/1987 | Kiewit et al. | 358/84 |
| 4,703,476 A | 10/1987 | Howard | 370/76 |
| 4,712,103 A | 12/1987 | Gotanda | 340/825.31 |
| 4,718,106 A | 1/1988 | Weinblatt | 455/2 |
| 4,739,377 A | 4/1988 | Allen | 355/133 |
| 4,750,173 A | 6/1988 | Blüthgen | 370/111 |
| 4,765,656 A | 8/1988 | Becker et al. | 283/70 |
| 4,775,901 A | 10/1988 | Nakano | 360/60 |
| 4,776,013 A | 10/1988 | Kafri et al. | 380/54 |
| 4,805,020 A | 2/1989 | Greenberg | 358/147 |
| 4,807,031 A | 2/1989 | Broughton et al. | 358/142 |
| 4,811,357 A | 3/1989 | Betts et al. | 375/1 |
| 4,811,408 A | 3/1989 | Goldman | 382/2 |
| 4,820,912 A | 4/1989 | Samyn | 235/449 |
| 4,825,393 A * | 4/1989 | Nishiya | 364/560 |
| 4,835,517 A | 5/1989 | Van Der Gracht et al. | 340/310 A |
| 4,855,827 A | 8/1989 | Best | 358/143 |
| 4,864,618 A | 9/1989 | Wright et al. | 380/51 |
| 4,866,771 A | 9/1989 | Bain | 380/23 |
| 4,874,936 A | 10/1989 | Chandler et al. | 235/494 |
| 4,876,617 A | 10/1989 | Best et al. | 360/60 |
| 4,879,747 A | 11/1989 | Leighton et al. | 380/23 |
| 4,884,139 A | 11/1989 | Pommier | 358/142 |
| 4,885,632 A | 12/1989 | Mabey et al. | 358/84 |
| 4,903,301 A | 2/1990 | Kondo et al. | 381/30 |
| 4,908,836 A | 3/1990 | Rushforth et al. | 375/1 |
| 4,908,873 A | 3/1990 | Philibert et al. | 382/34 |
| 4,918,484 A | 4/1990 | Ujiie et al. | 355/41 |
| 4,920,503 A | 4/1990 | Cook | 364/521 |
| 4,921,278 A | 5/1990 | Shiang et al. | 283/87 |
| 4,939,515 A | 7/1990 | Adelson | 341/51 |
| 4,941,150 A | 7/1990 | Iwasaki | 375/1 |
| 4,943,973 A | 7/1990 | Werner | 375/1 |
| 4,943,976 A | 7/1990 | Ishigaki | 375/1 |
| 4,944,036 A | 7/1990 | Hyatt | 367/43 |
| 4,963,998 A | 10/1990 | Maufe | 360/60 |
| 4,965,827 A | 10/1990 | McDonald | 380/25 |
| 4,967,273 A | 10/1990 | Greenberg | 358/142 |
| 4,969,041 A | 11/1990 | O'Grady et al. | 358/142 |
| 4,972,471 A | 11/1990 | Gross et al. | 380/3 |
| 4,972,475 A | 11/1990 | Sant'Anselmo | 380/54 |
| 4,972,476 A | 11/1990 | Nathans | 380/23 |
| 4,979,210 A | 12/1990 | Nagata et al. | 380/3 |
| 4,993,068 A | 2/1991 | Piosenka et al. | 380/23 |
| 4,996,530 A | 2/1991 | Hilton | 341/120 |
| 5,003,590 A | 3/1991 | Lechner et al. | 380/5 |
| 5,010,405 A | 4/1991 | Schreiber et al. | 358/141 |
| 5,027,401 A | 6/1991 | Soltesz | 380/54 |
| 5,034,982 A | 7/1991 | Heninger et al. | 380/54 |
| 5,036,513 A | 7/1991 | Greenblatt | 370/125 |
| 5,063,446 A | 11/1991 | Gibson | 358/142 |
| 5,067,162 A * | 11/1991 | Driscoll, Jr. et al. | 382/5 |
| 5,073,899 A | 12/1991 | Collier et al. | 375/1 |
| 5,073,925 A | 12/1991 | Nagata et al. | 380/3 |
| 5,075,773 A | 12/1991 | Pullen et al. | 358/141 |
| 5,077,608 A | 12/1991 | Dubner | 358/183 |
| 5,077,795 A | 12/1991 | Rourke et al. | 380/55 |
| 5,079,648 A | 1/1992 | Maufe | 360/31 |
| 5,083,224 A | 1/1992 | Hoogendoorn et al. | 360/60 |
| 5,091,966 A | 2/1992 | Bloomberg et al. | 382/21 |
| 5,093,867 A * | 3/1992 | Hori et al. | 382/8 |
| 5,095,196 A | 3/1992 | Miyata | 235/382 |
| 5,103,459 A | 4/1992 | Gilhousen et al. | 375/1 |
| 5,113,437 A | 5/1992 | Best et al. | 380/3 |
| 5,128,525 A | 7/1992 | Stearns et al. | 235/454 |
| 5,134,496 A | 7/1992 | Schwab et al. | 358/335 |
| 5,144,660 A | 9/1992 | Rose | 380/4 |
| 5,146,457 A | 9/1992 | Veldhuis et al. | 370/111 |
| 5,148,498 A | 9/1992 | Resnikoff et al. | 382/54 |
| 5,150,409 A | 9/1992 | Elsner | 380/23 |
| 5,161,210 A | 11/1992 | Druyvesteyn et al. | 395/2 |
| 5,166,676 A | 11/1992 | Milheiser | 340/825.54 |
| 5,168,147 A | 12/1992 | Bloomberg | 235/456 |
| 5,181,786 A | 1/1993 | Hujink | 400/61 |
| 5,185,736 A | 2/1993 | Tyrrell et al. | 370/55 |
| 5,199,081 A | 3/1993 | Saito et al. | 382/2 |
| 5,200,822 A | 4/1993 | Bronfin et al. | 358/142 |
| 5,212,551 A | 5/1993 | Conanan | 358/143 |
| 5,213,337 A | 5/1993 | Sherman | 273/439 |
| 5,228,056 A | 7/1993 | Schilling | 375/1 |
| 5,243,423 A | 9/1993 | DeJean et al. | 358/142 |
| 5,245,165 A | 9/1993 | Zhang | 235/454 |
| 5,245,329 A | 9/1993 | Gokcebay | 340/825.31 |
| 5,247,364 A | 9/1993 | Banker et al. | 358/191.1 |
| 5,253,078 A | 10/1993 | Balkanski et al. | 358/426 |
| 5,257,119 A | 10/1993 | Funada et al. | 358/438 |
| 5,259,025 A | 11/1993 | Monroe et al. | 380/23 |
| 5,278,400 A | 1/1994 | Appel | 235/494 |
| 5,293,399 A | 3/1994 | Hefti | 375/7 |
| 5,295,203 A | 3/1994 | Krause et al. | 382/56 |
| 5,305,400 A | 4/1994 | Butera | 382/56 |
| 5,315,098 A * | 5/1994 | Tow | 235/494 |
| 5,319,453 A | 6/1994 | Copriviza et al. | 348/6 |
| 5,319,724 A | 6/1994 | Blonstein et al. | 382/56 |
| 5,319,735 A | 6/1994 | Preuss et al. | 395/2.14 |
| 5,325,167 A | 6/1994 | Melen | 356/71 |
| 5,327,237 A | 7/1994 | Gerdes et al. | 348/476 |
| 5,337,361 A * | 8/1994 | Wang et al. | 380/51 |
| 5,349,655 A | 9/1994 | Mann | 395/575 |
| 5,374,976 A * | 12/1994 | Spannenburg | 355/201 |
| 5,387,941 A | 2/1995 | Montgomery et al. | 348/473 |
| 5,394,274 A | 2/1995 | Kahn | 360/27 |
| 5,396,559 A | 3/1995 | McGrew | 380/54 |
| 5,408,542 A | 4/1995 | Callahan | 382/56 |

| | | | |
|---|---|---|---|
| 5,410,598 A | 4/1995 | Shear | 380/4 |
| 5,436,653 A | 7/1995 | Ellis et al. | 348/2 |
| 5,450,122 A | 9/1995 | Keene | 348/1 |
| 5,453,968 A | 9/1995 | Veldhuis et al. | 369/84 |
| 5,510,900 A | 4/1996 | Shirochi et al. | 358/335 |
| 5,530,759 A * | 6/1996 | Braudaway et al. | 380/54 |
| 5,537,216 A | 7/1996 | Yamashita et al. | 358/335 |
| 5,541,741 A | 7/1996 | Suzuki | 358/450 |
| 5,557,333 A | 9/1996 | Jungo et al. | 348/473 |
| 5,559,559 A | 9/1996 | Jungo et al. | 348/432 |
| 5,587,743 A | 12/1996 | Montgomery et al. | 348/473 |
| 5,617,148 A | 4/1997 | Montgomery | 348/473 |
| 5,689,587 A | 11/1997 | Bender et al. | 382/232 |
| 5,719,984 A | 2/1998 | Yamagata et al. | 386/95 |
| 5,721,788 A * | 2/1998 | Powell et al. | 382/100 |
| 5,790,932 A | 8/1998 | Komaki et al. | 399/366 |
| 5,809,160 A | 9/1998 | Powell et al. | 382/100 |
| 5,907,443 A | 5/1999 | Hirata | 360/60 |
| 5,930,377 A | 7/1999 | Powell et al. | 382/100 |
| 6,072,888 A | 6/2000 | Powell et al. | 382/100 |
| 6,137,892 A | 10/2000 | Powell et al. | 382/100 |
| 6,301,369 B2 | 10/2001 | Powell et al. | 382/100 |
| 6,307,950 B1 | 10/2001 | Powell et al. | 382/100 |
| 6,317,505 B1 | 11/2001 | Powell et al. | 382/100 |

OTHER PUBLICATIONS

Komatsu et al., "A Proposal on Digital Watermarking in Document Image Communication and Its Application to Realizing a Signature," Electronics and Communications in Japan, Part I, vol. 73, No. 5, 1990, pp. 22–23.*

Szepanski, "A Signal Theoretic Method for Creating Forgery–Proof Documents for Automatic Verification," in Proceedings of the 1979 Carnahan Conference on Crime Countermeasures, University of Kentucky, Lexington, KY, May 16–18, 1979, pp. 101–109.

Tanaka et al., "Embedding the Attribute Information Information into a Dithered Image," Systems and Computers in Japan, vol. 21, No. 7, 1990, pp. 43–50.

Jain, "Image Coding Via a Nearest Neighbors Image Model," IEEE Transactions on Communications, vol. COM–23, No. 3, Mar. 1975, pp. 318–331.

Kurak et al., "A Cautionary Note On Image Downgrading," 1992 IEEE, pp. 153–159.

Gabor, et al., "Theory of Communication," J. Inst. Elect. Eng. 93, 1946, pp. 429–441.

Roberts, "Picture Coding Using Pseudorandom Noise," IRE Trans. on Information Theory, vol. 8, No. 2, Feb., 1962, pp. 145–154.

Jain, "Image Coding Via a Nearest Neighbors Image Model," IEEE Transactions on Communications, vol. COM–23, No. 3, Mar. 1975, pp. 318–331.

Szepanski, "Optimization of Add–On Signals by Means of a Modified Training Algorithm for Linear Classifiers," IEEE Int'l Symp. On Info. Theory, Oct. 10, 1977, pp. 27–28.

Szepanski, "Binary Data Transmission Over Video Channels with Very Low Amplitude Data Signals," Fernseh– und Kino–Technik, vol. 32, No. 7, Jul., 1978, pp. 251–256. (German text with full English translation).

Szepanski, "Compatibility Problems in Add–On Data Transmission for TV–Channels," 2d Symp. and Tech. Exh On Electromagnetic Compatibility, Jun. 28, 1977, pp. 263–268.

Szepanski, Additive Binary Data Transmission for Video Signals, Conference of the Communications Engineering Society, 1980, NTG Technical Reports, vol. 74, pp. 343–351. (German text with full English translation).

Pickholtz et al., "Theory of Spread–Spectrum Communications—A Tutorial," Transactions on Communications, vol. COM–30, No. 5, May, 1982, pp. 855–884.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

Sheng et al., "Experiments on Pattern Recognition Using Invariant Fourier–Mellin Descriptors," Journal of Optical Society of America, vol. 3, No. 6, Jun., 1986, pp. 771–776.

Castro et al. "Registration of translated and Rotated Images using Finite Fourier Transforms," IEEE Transactions on Pattern Analysis and Machine Intelligence, vol. PAMI–9, No. 5, Sep. 1987, pp. 700–703.

Kassam, Signal Detection in Non–Gaussian Noise, Dowden & Culver, 1988, pp. 1–96.

Komatsu et al., "A Proposal on Digital Watermark in Document Image Communication and Its Application to Realizing a Signature," Electronics and Communications in Japan, Part 1, vol. 73, No. 5, 1990, pp. 22–33.

Nakamura et al., "A Unified Coding Method of Image and Text Data Using Discrete Orthogonal Transform," Systems and Computers in Japan, vol. 21, No. 3, 1990, pp. 87–92.

Tanaka, "Embedding the Attribute Information Into a Dithered Image," Systems and Computers in Japan, vol. 21, No. 7, 1990, pp. 43–50.

Arazi, et al., "Intuition, Perception, and Secure Communication," IEEE Transactions on Systems, Man, and Cybernetics, vol. 19, No. 5, Sep./Oct. 1989, pp. 1016–1020.

Schreiber et al., "A Compatible High–Definition Television System Using the Noise–Margin Method of Hiding Enhancement Information," SMPTE Journal, Dec. 1989, pp. 873–879.

Tanaka et al., "New Integrated Coding Schemes for Computer–Aided Facsimile," Proc. IEEE Int'l Conf. on Sys. Integration, Apr. 1990, pp. 275–281.

Tanaka et al., "Embedding Secret Information Into a Dithered Multi–Level Image," Proc. IEEE Military Comm. Conf., Sep. 1990, pp. 216–220.

Tanaka et al., "A Visual Retrieval System with Private Information for Image Database," International Conference on DSP Applications and Technology, Oct. 1991, pp. 415–421.

* cited by examiner

FIG. 3

| 6 | 7 | 7 | 7 | 6 | 5 | 7 | 8 | 12 | 15 | 15 | 14 | 12 | 8 | 8 |
|---|---|---|---|---|---|---|---|----|----|----|----|----|---|---|
| 6 | 6 | 5 | 6 | 5 | 8 | 8 | 12 | 13 | 15 | 15 | 12 | 8 | 3 | 5 |
| 7 | 6 | 7 | 6 | 8 | 9 | 12 | 15 | 15 | 13 | 12 | 10 | 8 | 4 | 4 |
| 6 | 6 | 6 | 7 | 8 | 9 | 13 | 15 | 15 | 12 | 11 | 10 | 8 | 3 | 3 |
| 5 | 5 | 6 | 5 | 8 | 9 | 15 | 15 | 12 | 11 | 10 | 8 | 8 | 3 | 3 |
| 5 | 5 | 5 | 5 | 8 | 10 | 15 | 15 | 12 | 11 | 10 | 7 | 7 | 3 | 5 |
| 6 | 5 | 5 | 5 | 10 | 13 | 15 | 14 | 10 | 8 | 7 | 6 | 4 | 4 | 4 |
| 5 | 6 | 5 | 5 | 12 | 15 | 13 | 10 | 8 | 8 | 7 | 5 | 4 | 3 | 2 |
| 6 | 6 | 7 | 6 | 8 | 10 | 9 | 11 | 10 | 8 | 7 | 6 | 5 | 4 | 3 |
| 3 | 2 | 4 | 4 | 7 | 8 | 6 | 10 | 11 | 9 | 9 | 8 | 5 | 5 | 2 |
| 3 | 4 | 4 | 4 | 6 | 6 | 6 | 10 | 11 | 9 | 8 | 8 | 6 | 6 | 3 |
| 2 | 2 | 2 | 4 | 5 | 4 | 4 | 8 | 8 | 9 | 9 | 8 | 8 | 6 | 4 |
| 1 | 1 | 2 | 4 | 4 | 2 | 3 | 5 | 7 | 7 | 6 | 6 | 6 | 5 | 5 |
| 2 | 2 | 2 | 3 | 3 | 4 | 4 | 4 | 5 | 6 | 6 | 6 | 5 | 4 | 4 |
| 2 | 2 | 2 | 2 | 2 | 2 | 3 | 4 | 5 | 5 | 5 | 6 | 6 | 7 | 7 |

IMAGE MARKING WITH PIXEL MODIFICATION

This application is a continuation of application Ser. No. 09/317 784, now U.S. Pat. 6,072,888, which is a continuation of application Ser. No. 09/074,632, filed May 7, 1998, now U.S. Pat. No. 5,930,377, which is a continuation of application Ser. No. 08/969,072, filed Nov. 12, 1997, now U.S. Pat. No. 5,809,160, which is a continuation of application Ser. No. 07/923,841, filed Jul. 31, 1992, now U.S. Pat. No. 5,721,788.

TECHNICAL FIELD

This invention relates to a method of and system for encoding a signature into a digital image and auditing a digital subject image to determine if it was derived from the encoded image.

BACKGROUND OF THE INVENTION

Various images in traditional print or photographic media are commonly distributed to many users. Examples include the distribution of prints of paintings to the general public and photographs and film clips to and among the media. Owners may wish to audit usage of their images in print and electronic media and so require a method to analyze print, film and digital images to determine if they were obtained directly from the owners or derived from their images. For example, the owner of an image may desire to limit access or use of the image. To monitor and enforce such a limitation, it would be beneficial to have a method of verifying that a subject image is copied or derived from the owner's image. The method of proof should be accurate and incapable of being circumvented. Further, the method should be able to detect unauthorized copies that have been resized, rotated, cropped, or otherwise altered slightly.

In the computer field, digital signatures have been applied to non-image digital data in order to identify the origin of the data. For various reasons these prior art digital signatures have not been applied to digital image data. One reason is that these prior art digital signatures are lost if the data to which they are applied are modified. Digital images are often modified each time they are printed, scanned, copied, or photographed due to unintentional "noise" created by the mechanical reproduction equipment used. Further, it is often desired to resize, rotate, crop or otherwise intentionally modify the image. Accordingly, the existing digital signatures are unacceptable for use with digital images.

SUMMARY OF THE INVENTION

The invention includes a method and system for embedding image signatures within visual images, applicable in the preferred embodiments described herein to digital representations as well as other media such as print or film. The signatures identify the source or ownership of images and distinguish between different copies of a single image. In preferred embodiments, these signatures persist through image transforms such as resizing and conversion to or from print or film and so provide a method to track subsequent use of digital images including derivative images in print or other form.

In a preferred embodiment described herein, a plurality of signature points are selected that are positioned within an original image having pixels with pixel values. The pixel values of the signature points are adjusted by an amount detectable by a digital scanner. The adjusted signature points form a digital signature that is stored for future identification of subject images derived from the image.

The preferred embodiment of the invention described herein embeds a signature within the original image by locating candidate points such as relative extrema in the pixel values. Signature points are selected from among the candidate points and a data bit is encoded at each signature point by adjusting the pixel value at and surrounding each point. Preferably, the signature is redundantly embedded in the image such that any of the redundant representations can be used to identity the signature. The signature is stored for later use in identifying a subject image.

According to a preferred embodiment, the identification of a subject image includes ensuring that the subject image is normalized, i.e. of the same size, rotation, and brightness level as the original image. If not already normalized, the subject image is normalized by aligning and adjusting the luminance values of subsets of the pixels in the subject image to match corresponding subsets in the original image. The normalized subject image is then subtracted from the original image and the result is compared with the stored digital signature. In alternate embodiment, the normalized subject image is compared directly with the signed image.

BRIEF DESCRIPTION OF THE DRAWINGS

FIG. 3 is a representation of a digital image in the form of an array of pixels with pixel values.

DETAILED DESCRIPTION OF THE INVENTION

The present invention includes a method and system for embedding a signature into an original image to create a signed image. A preferred embodiment includes selecting a large number of candidate points in the original image and selecting a number of signature points from among the candidate points. The signature points are altered slightly to form the signature. The signature points are stored for later use in auditing a subject image to determine whether the subject image is derived from the signed image.

The signatures are encoded in the visible domain of the image and so become part of the image and cannot be detected or removed without prior knowledge of the signature. A key point is that while the changes manifested by the signature are too slight to be visible to the human eye, they are easily and consistently recognizable by a common digital image scanner, after which the signature is extracted, interpreted and verified by a software algorithm.

In contrast to prior art signature methods used on non-image data, the signatures persist through significant image transformations that preserve the visible image but may completely change the digital data. The specific transforms allowed include resizing the image larger or smaller, rotating the image, uniformly adjusting color, brightness and/or contrast, and limited cropping. Significantly, the signatures persist through the process of printing the image to paper or film and rescanning it into digital form.

Figure 1:
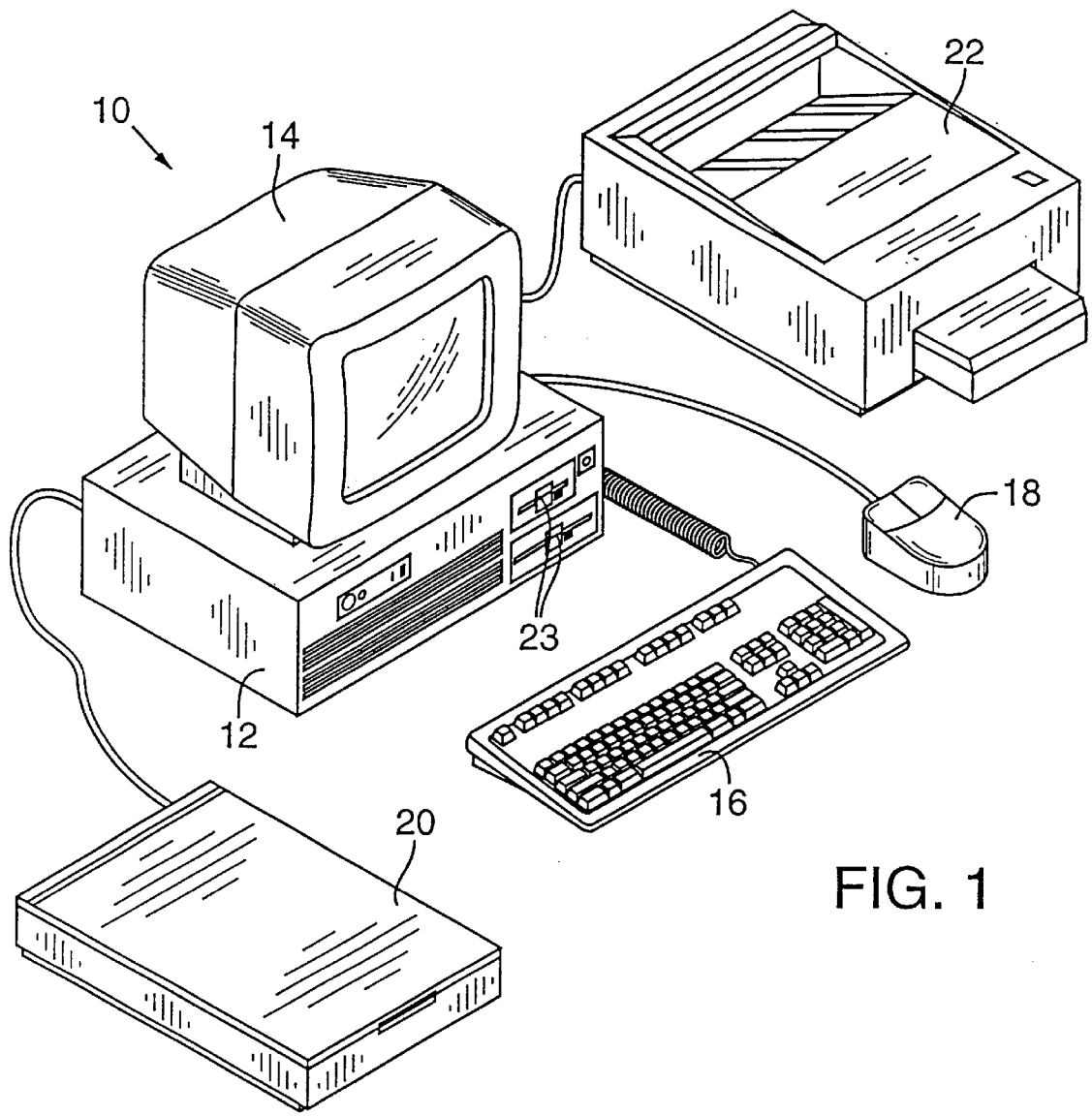
FIG. 1 is a diagram of a computer system used in a preferred embodiment of the present invention.

Shown in FIG. 1 is a computer system 10 that is used to carry out an embodiment of the present invention. The computer system 10 includes a computer 12 having the usual complement of memory and logic circuits, a display monitor 14, a keyboard 16, and a mouse 18 or other pointing device. The computer system also includes a digital scanner 20 that is used to create a digital image representative of an original image such as a photograph or painting. Typically, delicate images, such as paintings, are converted to print or film before being scanned into digital form. In one embodiment a printer 22 is connected to the computer 12 to print digital images output from the processor. In addition, digital images can be output in a data format to a storage medium 23 such as a floppy disk for displaying later at a remote site. Any digital display device may be used, such a common computer printer, X-Y plotter, or a display screen.

Figure 2:
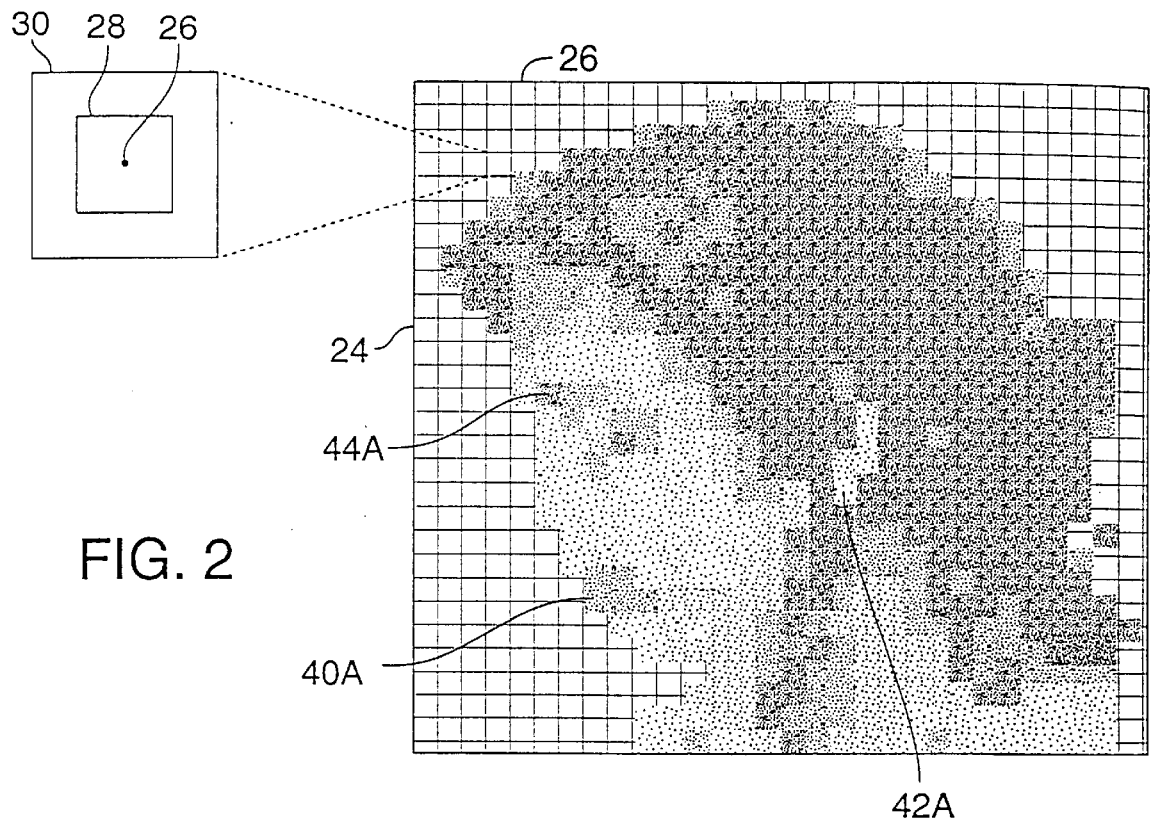
FIG. 2 is a sample digital image upon which a preferred embodiment of the present invention is employed.

An example of the output of the scanner 20 to the computer 12 is a digital image 24 shown in FIG. 2. More accurately, the scanner outputs data representative of the digital image and the computer causes the digital image 24 to be displayed on the display monitor 14. As used herein "digital image" refers to the digital data representative of the digital image, the digital image displayed on the monitor or other display screen, and the digital image printed by the printer 22 or a remote printer.

The digital image 24 is depicted using numerous pixels 24 having various pixel values. In the gray-scale image 24 the pixel values are luminance values representing a brightness level varying from black to white. In a color image the pixels have color values and luminance values, both of which being pixel values. The color values can include the values of any components in a representation of the color by a vector. FIG. 3 shows digital image 24A in the form of an array of pixels 26. Each pixel is associated with one or more pixel values, which in the example shown in FIG. 3 are luminance values from 0 to 15.

The digital image 24 shown in FIG. 2 includes thousands of pixels. The digital image 24A represented in FIG. 3 includes 225 pixels. The invention preferably is used for images having pixels numbering in the millions. Therefore, the description herein is necessarily a simplistic discussion of the utility of the invention.

According to a preferred embodiment of the invention numerous candidate points are located within the original image. Signature points are selected from among the candidate points and are altered to form a signature. The signature is a pattern of any number of signature points. In a preferred embodiment, the signature is a binary number between 16 and 32 bits in length. The signature points may be anywhere within an image, but are preferably chosen to be as inconspicuous as possible. Preferably, the number of signature points is much greater than the number of bits in a signature. This allows the signature to be redundantly encoded in the image. Using a 16 to 32 bit signature, 50–200 signature points are preferable to obtain multiple signatures for the image.

Figure 4:
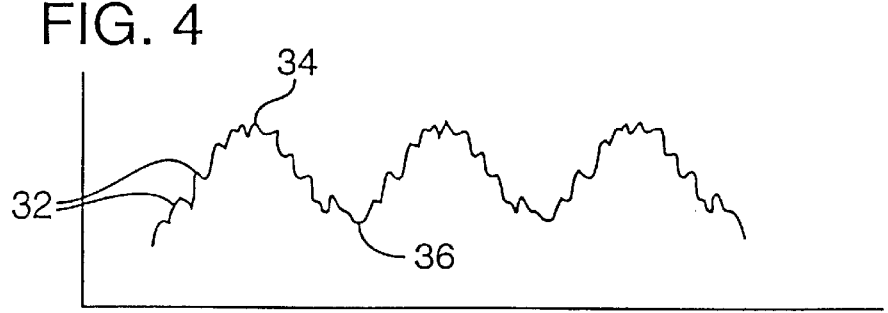
FIG. 4 is graphical representation of pixel values showing relative minima and maxima pixel values.

A preferred embodiment of the invention locates candidate points by finding relative maxima and minima, collectively referred to as extrema, in the image. The extrema represent local extremes of luminance or color. FIG. 4 shows what is meant by relative extrema. FIG. 4 is a graphical representation of the pixel values of a small portion of a digital image. The vertical axis of the graph shows pixel values while the horizontal axis shows pixel positions along a single line of the digital image. Small undulations in pixel values indicated at 32, represent portions of the digital image where only small changes in luminance or color occur between pixels. A relative maximum 34 represents a pixel that has the highest pixel value for a given area of the image. Similarly, a relative minimum 36 represents a pixel that has the lowest pixel value for a given area of the image.

Relative extrema are preferred signature points for two major reasons. First, they are easily located by simple, well known processing. Second, they allow signature points to be encoded very inconspicuously.

One of the simplest methods to determine relative extrema is to use a "Difference of Averages" technique. This technique employs predetermined neighborhoods around each pixel 26; a small neighborhood 28 and a large neighborhood 30, as shown in FIGS. 2 and 3. In the present example the neighborhoods are square for simplicity, but a preferred embodiment employs circular neighborhoods. The technique determines the difference between the average pixel value in the small neighborhood and the average pixel value of the large neighborhood. If the difference is large compared to the difference for surrounding pixels then the first pixel value is a relative maxima or minima.

Using the image of FIG. 3 as an example, the Difference of Averages for the pixel 26A is determines as follows. The pixel values within the 3×3 pixel small neighborhood 23A add up to 69; dividing by 9 pixels gives an average of 7.67. The pixel values within the 5×5 pixel large neighborhood 30A add up to 219; dividing by 25 pixels gives an average of 8.76 and a Difference of Averages of −1.09. Similarly, the average in small neighborhood 28G is 10.0; the average in large neighborhood 30G is 9.8; the Difference of Averages for pixel 26G is therefore 0.2. Similar computations on pixels 26B–26F produce the following table:

| | 26A | 26B | 26C | 26D | 26E | 26F | 26G |
|---|---|---|---|---|---|---|---|
| Small Neighborhood | 7.67 | 10.56 | 12.89 | 14.11 | 13.11 | 11.56 | 10.0 |
| Large Neighborhood | 8.76 | 10.56 | 12.0 | 12.52 | 12.52 | 11.36 | 9.8 |
| Difference of Averages | −1.09 | 0.0 | 0.89 | 1.59 | 0.59 | 0.2 | 0.2 |

Based on pixels 26A–26G, there may be a relative maximum at pixel 26D, whose Difference of Averages or 1.59 is greater than the Difference of Averages for the other examined pixels in the row. To determine whether pixel 26D is a relative maximum rather than merely a small undulation, its Difference of Averages must be compared with the Difference of Averages for the pixels surrounding it in a larger are.

Preferably, extrema within 10% of the image size of any side are not used as signature points. This protects against loss of signature points caused by the practice of cropping the border area of an image. It is also preferable that relative extrema that are randomly and widely spaced are used rather than those that appear in regular patterns.

Using the Difference of Averages technique or other known techniques, a large number of extrema are obtained, the number depending on the pixel density and contrast of the image. Of the total number of extrema found, a preferred embodiment chooses 50 to 200 signature points. This may be done manually by a user choosing with the keyboard 16, mouse 18, or other pointing device each signature point from among the extrema displayed on the display monitor 14. The extrema may be displayed as a digital image with each point chosen by using the mouse or other pointing device to point to a pixel or they may be displayed as a list of coordinates which are chosen by keyboard, mouse, or other pointing device. Alternatively, the computer 12 can be programmed to choose signature points randomly or according to a preprogramed pattern.

One bit of binary data is encoded in each signature point in the image by adjusting the pixel values at and surrounding the point. The image is modified by making a small, preferably 2%–10% positive or negative adjustment in the pixel value at the exact signature point, to represent a binary zero or one. The pixels surrounding each signature point, in approximately a 5×5 to 10×10 grid, are preferably adjusted proportionally to ensure a continuous transition to the new value at the signature point. A number of bits are encoded in the signature points to form a pattern which is the signature for the image.

In a preferred embodiment, the signature is a pattern of all of the signature points. When auditing a subject image, if a statistically significant number of potential signature points in the subject image match corresponding signature points in the signed image, then the subject image is deemed to be derived from the signed image. A statistically significant number is somewhat less than 100%, but enough to be reasonably confident that the subject image was derived from the signed image.

In an alternate embodiment the signature is encoded using a redundant pattern that distributes it among the signature points in a manner that can be reliably retrieved using only a subset of the points. One embodiment simply encodes a predetermined number of exact duplicates of the signature. Other redundant representation methods, such as an error-correcting code, may also be used.

In order to allow future auditing of images to determine whether they match the signed image, the signature is stored in a database in which it is associated with the original image. The signature can be stored by associating the bit value of each signature point together with x-y coordinates of the signature point The signature may be stored separately or as part of the signed image. The signed image is then distributed in digital form.

As discussed above, the signed image may be transformed and manipulated to form a derived image. The derived image is derived from the signed image by various transformations, such as resizing, rotating, adjusting color, brightness and/or contrast, cropping and converting to print or film. The derivation may make place in multiple steps or processes or may simply be the copying of the signed image directly.

It is assumed that derivations of these images that an owner wishes to track include only applications which substantially preserve the resolution and general quality of the image. While a size reduction by 90%, a significant color alteration or distinct-pixel-value reduction may destroy the signature; they also reduce the image's significance and value such that no auditing is desired.

In order to audit a subject image according to a preferred embodiment, a user identifies the original image of which the subject image is suspected of being a duplicate. For a print or film image, the subject image is scanned to create a digital image file. For a digital image, no scanning is necessary. The subject digital image is normalized using techniques as described below to the same size, and same overall brightness, contrast and color profile as the unmodified original image. The subject image is analyzed by the method described below to extract the signature, if present, and compare it to any signatures stored for that image.

The normalization process involves a sequence of steps to undo transformations previously made to the subject image, to return it as close as possible to the resolution and appearance of the original image. It is assumed that the subject image has been manipulated and transformed as described above. To align the subject image with the original image, a preferred embodiment chooses three or more points from the subject image which correspond to points in the original image. The three or more points of the subject image are aligned with the corresponding points in the original image. The points of the subject image not selected are rotated and resized as necessary to accommodate the alignment of the points selected.

Figure 5:
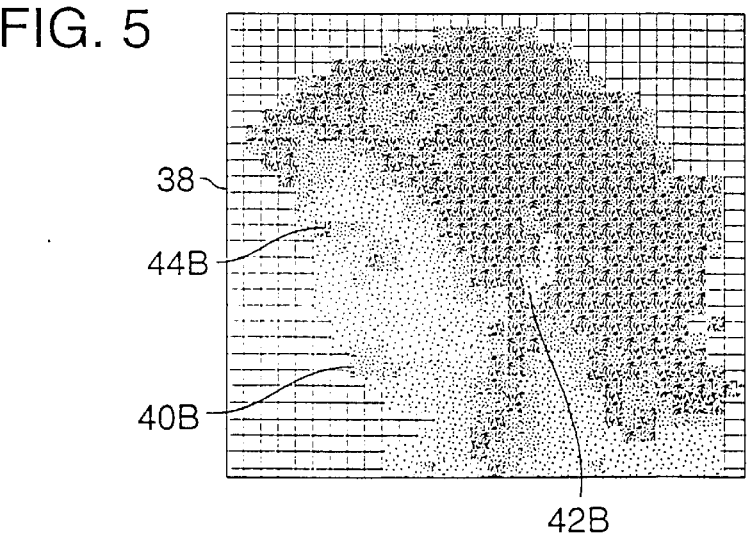
FIG. 5 is a digital subject image that is compared to the image of FIG. 2 according to a preferred embodiment of the present invention.

For example, FIG. 5 shows a digital subject image 38 that is smaller than the original image 24 shown in FIG. 2. To resize the subject image, a user points to three points such as the mouth 40B, ear 42B and eye 44B of the subject image using, the mouse 18 or other pointer. Since it is usually difficult to accurately point to a single pixel, the computer selects the nearest extrema to the pixel pointed to by the user. The user points to the mouth 40A, ear 42A, and eye 44A of the original image. The computer 12 resizes and rotates the subject image as necessary to ensure that points 40B, 42B, and 44B are positioned with respect to each other in the same way that points 40A, 42A, and 44A are positioned with respect to each other in the original image. The remaining pixels are repositioned in proportion to the repositioning of points 40B, 42B and 44B. By aligning three points the entire subject image is aligned with the original image without having to align each pixel independently.

After the subject image is aligned, the next step is to normalize the brightness, contrast and/or color of the subject image. Normalizing involves adjusting pixel values of the subject image to match the value-distribution profile of the original image. This is accomplished by a technique analogous to that used to align the subject image. A subset of the pixels in the subject image are adjusted to equal corresponding pixels in the original image. The pixels not in the subset are adjusted in proportion to the adjustments made to the pixels in the subset. The pixels of the subject image corresponding to the signature points should not be among the pixels in the subset. Otherwise any signature points in the subject image will be hidden from detection when they are adjusted to equal corresponding pixels in the original image.

In a preferred embodiment, the subset includes the brightest and darkest pixels of the subject image. These pixels are adjusted to have luminance values equal to the luminance values of corresponding pixels in the original image. To ensure that any signature points can be detected, no signature points should be selected during the signature embedding process described above that are among the brightest and darkest pixels of the original image. For example, one could use pixels among the brightest and darkest 3% for the adjusting subset, after selecting signature points among less than the brightest and darkest 5% to ensure that there is no overlap.

When the subject image is fully normalized, it is preferably compared to the original image. One way to compare images is to subtract one image from the other. The result of the subtraction is a digital image that includes any signature points that were present in the subject image. These signature points, if any, are compared to the stored signature points for the signed image. If the signature points do not match, then the subject image is not an image derived from the signed image, unless the subject image was changed substantially from the signed image.

In an alternative embodiment the normalized subject image is compared directly with the signed image instead of subtracting the subject image from the original image. This comparison involves subtracting the subject image from the signed image. If there is little or no image resulting from the subtraction, then the subject image equals to the signed image, and therefore has been derived from the signed image.

In another alternate embodiment, instead of normalizing the entire subject image; only a section of the subject image surrounding each potential signature point is normalized to be of the same general resolution and appearance as a corresponding section of the original image. This is accomplished by selecting each potential signature point of the subject image and selecting sections surrounding each potential signature point. The normalization of each selected section proceeds according to methods similar to those disclosed above for normalizing the entire subject image.

Normalizing each selected section individually allows each potential signature point of the subject image to be compared directly with a corresponding signature point of the signed image. Preferably, an average is computed for each potential signature point by averaging the pixel value of the potential signature point with the pixel values of a plurality of pixels surrounding the potential signature point. The average computed for each signature is compared directly with a corresponding signature point of the signed image.

While the methods of normalizing and extracting a signature from a subject image as described above are directed to luminance values, similar methods may be used for color values. Instead of or in addition to normalizing by altering luminance values, the color values of the subject image can also be adjusted to equal corresponding color values in an original color image. However, it is not necessary to adjust color values in order to encode a signature in or extract a signature from a color image. Color images use pixels having pixel values that include luminance values and color values. A digital signature can be encoded in any pixel values regardless of whether the pixel values are luminance values, color values, or any other type of pixel values. Luminance values are preferred because alterations may be made more easily to luminance values without the alterations being visible to the human eye.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of placing a watermark on a digital image, comprising the steps of:
   providing a digital original image;
   providing a digital watermark image; and,
   producing a watermarked image by superimposing the watermark image on the original image without changing the chromaticities of pixels of the original image as watermarked.

2. The method of claim 1 wherein the step of producing comprises the step of:
   for a selected number of points, modifying the corresponding pixel of the original image by changing the brightness but not the color.

3. The method of claim 1 wherein the step of producing comprises the step of:
   for a selected number of relative extrema, modifying the corresponding pixel of the original image by changing the brightness but not the color.

4. A method of applying an imperceptible digital watermark to an original image comprising the step of applying the watermark to the original image as a percentage correction on pixel sample values of the original image in a linear color space such that the chromaticities of the pixels are not changed.

5. A system for placing a watermark on a digital image, comprising:
   a storage device having a digital original image and a digital watermark stored therein; and,
   means for producing a watermarked image by superimposing the watermark on the original image without changing the chromaticities of the original image as watermarked.

6. The system of claim 5 wherein the means for producing comprises:
   means for modifying each selected pixel of the original image corresponding to a selected point, by changing the brightness but not the color.

7. The system of claim 5 wherein the means for producing comprises:
   means for modifying each selected pixel of the original image corresponding to a relative extrema, by changing the brightness but not the color.

8. A system for applying an imperceptible digital watermark to an original digital image, comprising:
   means for identifying a subset of pixels of the original image that will be modified as a result of applying the watermark;
   a programmed processor operable to determine a modification corresponding to a percentage adjustment based on the values of the color components for each of the pixels in the subset,
   means for multiplying each of the color components of each of the pixels in the subset by its percentage adjustment, and
   means for storing a resulting watermarked image.

9. A method for applying an imperceptible digital watermark to an original digital image, comprising the steps of:
   identifying a subset of pixels of the original image to be modified;
   for each pixel in said subset of pixels, determining a percentage value based on the values of the color components of said pixel; and,
   multiplying each component of said pixel by said percentage value, and,
   storing a resulting watermarked image.

10. A method for applying an imperceptible digital watermark to an original digital image, comprising the steps of:
    identifying a subset of pixels of the original image to be modified;
    for each pixel in said subset of pixels, determining a percentage value based on the values of the color components of said pixel; and,
    modifying each component of said pixel by said percentage value, and, storing a resulting watermarked image.

* * * * *